United States Patent
Narasimhan (12)

(10) Patent No.: US 6,561,793 B1
(45) Date of Patent: May 13, 2003

(54) INFRARED HEATER WITH IMPROVED MATRIX

(75) Inventor: Dave Narasimhan, Flemington, NJ (US)

(73) Assignee: Honeywell ASCa Inc., British Columbia (CA)

( * ) Notice: Subject to any disclaimer, the term of this patent is extended or adjusted under 35 U.S.C. 154(b) by 0 days.

(21) Appl. No.: 09/638,731

(22) Filed: Aug. 14, 2000

(51) Int. Cl.$^7$ ............................................. F23D 14/16
(52) U.S. Cl. ........................... 431/326; 501/81; 501/88; 501/95.1
(58) Field of Search .................... 431/326, 328, 431/7; 501/81, 88, 95.1, 96.1, 107; 524/430, 431

(56) References Cited

U.S. PATENT DOCUMENTS

| | | | | |
|---|---|---|---|---|
| 3,833,338 A | * | 9/1974 | Badrock | ..................... 431/328 |
| 4,504,218 A | * | 3/1985 | Mihara et al. | ............... 431/326 |
| 4,654,000 A | | 3/1987 | Smith | ......................... 431/328 |
| 5,053,362 A | * | 10/1991 | Chi et al. | ..................... 501/95 |
| 5,108,964 A | * | 4/1992 | Corbett et al. | ................ 501/95 |

* cited by examiner

Primary Examiner—Sara Clarke
(74) Attorney, Agent, or Firm—Christie, Parker & Hale, LLP

(57) ABSTRACT

A method of forming a porous ceramic matrix for use in an infrared heating unit comprises the steps of mixing ceramic fibers, organic binders and particulate material capable of infrared emissivity with an ionic wetting agent to form a moldable ceramic mixture, and molding the mixture to a desired shape. A ceramic matrix with infrared emissivity particles substantially uniformly distributed through the matrix is formed which results in a high intensity, high thermal efficiency matrix for use in an infrared heater. In a further aspect, the matrix can be formed using at least two different compositions of ceramic fibers each composition having a different melting temperature. During operation of the matrix in a heater unit over normal operating temperatures, melting and re-crystallization of the ceramic fibers with the lower melting temperature occurs resulting in the creation of crystalline bond regions between the two fiber compositions. This hardens the matrix at the working heated surface increasing the surfaces resistance to erosion and providing a "self-healing" ceramic matrix with an enhanced service life.

36 Claims, 2 Drawing Sheets

INFRARED HEATER WITH IMPROVED MATRIX

FIELD OF THE INVENTION

This invention relates to heating apparatus for treating a web of material, and, more particularly to an improved matrix and an infrared (IR) heater incorporating the matrix for heating a paper web.

BACKGROUND OF THE INVENTION

Conventional papermaking machinery for producing a continuous sheet of paper includes equipment to set the sheet properties of the paper as it is being manufactured. One of the more basic operations on a paper machine is control of the cross-direction moisture profile by drying with gas infrared heaters. Such heaters are also useful for drying coatings onto a paper web.

Typical infrared heating systems designed specifically for papermaking machinery comprise a series of independently controllable heater units or emitters that are positioned over the paper web in the cross-machine direction CD. Each heater unit consists of a porous refractory ceramic matrix that is fitted into a metallic housing. A plurality of housings are positioned side by side to extend across the web. The porous ceramic matrix is bonded to an aluminum housing with silicone to define a plenum chamber. The plenum chamber of the housing is supplied with an air/fuel mixture via an inlet that connects to a fuel supply. Gaseous fuel in the form of natural gas or propane is mixed with air in a 1:10 ratio to create the air/fuel mixture. Combustion occurs only at the outer 3 mm of the ceramic matrix surface adjacent the paper web to provide fast heat up times of about 5 seconds and fast cool down times of about one second.

During normal operation, the temperature of the heater will be about 40° C. at the inner surface of the ceramic matrix to between 575° C. to 950° C. at the exterior surface of the matrix adjacent where combustion occurs.

U.S. Pat. No. 4,654,000 issued to Smith on Mar. 31, 1987 is an example of a prior art infrared heating unit.

Applicants' U.S. patent application Ser. No. 09/557,093 filed Apr. 21, 2000 entitled INFRARED HEATER is a further example of infrared heating unit. This unit has a novel mounting scheme for connecting the matrix to the metallic housing.

The matrix of a typical infrared unit uses ceramic fibres and organic binders to create a porous material that acts as an infrared emitter when heated to the above described temperatures. Often high emissivity materials such as silicon carbide are incorporated into the matrix to enhance the infra-red output.

Generally, an aqueous molding process is used to form the ceramic matrix. This tends to result in the ceramic material forming clumps which are not well wetted by the aqueous medium. As a consequence, the infrared emitters such as silicon carbide particles are deposited in a cellular configuration comprising geometrical regions surrounding the ceramic clumps.

SUMMARY OF THE INVENTION

Applicant has discovered that it is possible to better distribute the infrared emitter particles throughout the matrix by employing ionic wetting agents during the aqueous molding process. The presence of more uniformly distributed infra-red emitting particles in the matrix, particularly in the outer working surface, results in increased infrared output from the emitters at the same gas consumption. Therefore, it is possible to consume less gas to lower the exhaust gas volume and temperature to achieve the same infrared output. Lower exhaust gas temperatures lead to decreased wear on the equipment and improved durability.

The organic binder is also better distributed throughout the ceramic matrix due to the ionic wetting agent, resulting in improved strength and strength uniformity of the matrix.

Accordingly, the present invention provides a method of forming a porous ceramic matrix for use in an infrared heating unit comprising the steps of:

mixing ceramic fibers, organic binders and particulate material capable of infrared emissivity with an ionic wetting agent to form a moldable ceramic mixture; and molding the mixture to a desired shape.

The present invention also provides a ceramic matrix for use in an infrared heating unit comprising a mixture of ceramic fibers, organic binders and particulate material capable of infrared emissivity formed with an ionic wetting agent such that the particulate material capable of infrared emissivity is mixed substantially uniformly throughout the matrix.

In a preferred embodiment, formation of the ceramic matrix involves the additional step of mixing ceramic fibers of a different composition having a different melting temperature into the mixture. This results in a ceramic matrix with improved resistance to erosion and an enhanced service life. During operation of the matrix in a heater unit over normal operating temperatures, melting and re-crystallization of the ceramic fiber composition with the lower melting temperature occurs resulting in the creation of crystalline bond regions between the two fiber compositions. This hardens the matrix at the heating surface.

In a further aspect, the present invention provides an infrared heating unit comprising:

a metallic housing;

a ceramic matrix comprising a mixture of ceramic fibers, organic binders and particulate material capable of infrared emissivity formed with an ionic wetting agent such that the particulate material capable of infrared emissivity is mixed substantially uniformly throughout the matrix;

the matrix being mounted in the housing and having an inner surface, side walls and an external surface, the inner surface of the ceramic matrix and the housing cooperating to define a chamber;

an inlet to the housing to admit a gas/air combustion mixture to the chamber whereby the gas/air mixture passes through the ceramic matrix to burn adjacent the external surface of the ceramic matrix to heat the external surface.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
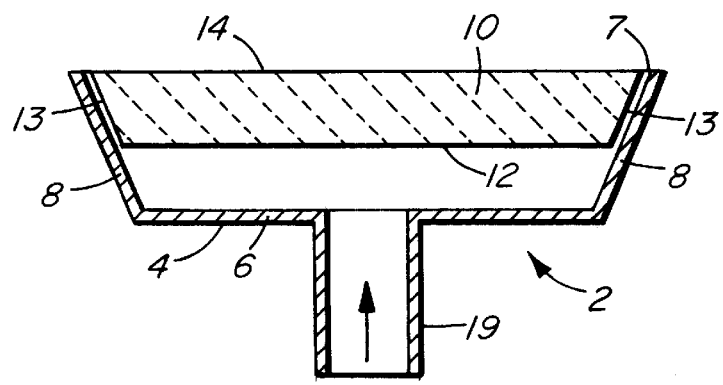
FIG. 1 is a schematic cross-section through an infrared heating unit according to the present invention incorporating the novel ceramic matrix.

Referring to FIG. 1, there is shown schematically in cross-section a gas infrared heating unit or emitter 2 according to the present invention incorporating an improved ceramic matrix. A metallic housing formed from a metal such as aluminum defines a frame 4 having a back wall 6 and four side walls 8. The side walls terminate at a front opening 7 in the frame. A porous refractory ceramic matrix 10 is formed as a block that substantially corresponds in shape and size to the opening 7 of the frame. The block of ceramic matrix 10 has an inner surface 12, side walls 13 and an external surface 14 opposite inner surface 12. The block is inserted into frame 4 such that inner surface 12 is spaced apart from back wall 6 of the frame. The side walls 13 of the block of ceramic matrix are bonded to the adjacent side walls 8 of frame 4 to retain the block in place within the housing. A chamber 16 is defined between the back wall 6 of frame 4 and the inner surface 12 of the ceramic matrix.

There is an inlet 19 through frame 4 into chamber 16 to admit an air/fuel mixture to the chamber. The fuel is typically natural gas or propane and is mixed with air in a conventional manner in a ratio of approximately 1:10 to create a combustion mixture. The combustion mixture passes through the porous ceramic matrix to burn adjacent the external surface 14 of the ceramic matrix to heat the external surface to incandescence to provide infrared heat energy for drying of the paper web.

The heater of the present invention relies on a ceramic matrix 10 having a novel structure that provides improved infrared output and high thermal efficiency. The matrix comprises a mixture of ceramic fibers, organic binders and particulate material capable of high infrared emissivity, such as silicon carbide particles or silicon particles. The ceramic fibers and organic binders are conventional and used in conventional amounts and proportions. The ceramic fibers are selected from materials such as alumina silica fibers or alumina silica zirconia fibers. These fibers are manufactured by several companies such as Thermal Ceramics, Inc. of 2102 Old Savannah Rd., P.O. Box 923 Augusta, Ga. 30903 USA, under the trade name of Superwool, Unifrax Corp. at 2351 Whirlpool St., P.O. Box 156 Niagara Falls, N.Y. 14302 USA-under the trade name of Fiberfrax, or by Rath Performance Fibers Inc. at Carr Executive Center-Suite 131, 501 Silverside Rd. Wilmington, Del. 19809 USA under the trade name of HTZ bulk fiber and Altra fibers. The organic binders can be selected from such material as starch, thermoplastic polymers, or agar cereal binder. The particulate material capable of infrared emissivity is preferably silicon carbide, but other possible easy to mix low density materials include silicon, silicon nitride, silicon carbonitride. Other high emissivity materials include intermetallic compounds such as titanium diboride, titanium silicide, niobium silicide,or tantallum silicide.

Forming the novel ceramic matrix 10 of the present invention involves mixing the ceramic fibers, organic binders and the particulate material for infrared emissivity with an ionic wetting agent in an aqueous molding process. Preferably, the ceramic fibers are added to water with an ionic wetting agent to form an aqueous slurry. Next, the organic binder and the infrared emissive particulate material are added. Particulate material of one type can be used or a mixture of different types is also possible. In the prior art molding process, the absence of a wetting agent tends to result in clumps of ceramic fibers forming with the result that the infrared emissive particulate material suffers from limited distribution in the matrix about the exterior of the clumps. The method of the present invention relies on the use of ionic wetting agents which act to create a substantially uniform distribution of infrared emissive particulate material throughout the matrix. Anionic or cationic wetting agents have hydrophobic and hydrophilic groups in the molecule which bond one side to the ceramic fiber or particle, and the other side to the water molecule. This essentially wets the ceramic fiber or particle with the water molecule allowing the penetration of the organic binder. This process essentially prevents the clumping of the fibers or agglomeration of the particles in a cellular form.

Preferably, the ionic wetting agents comprise an anionic or cationic detergent. Examples of appropriate agents are Alconox™, and other commercial detergents including several brands of dish washing liquids.

Once mixing and wetting is completed, the resulting mixture is molded into a desired shape for fitting into the housing of an infrared heater.

In prototype testing, the presence of the substantially uniformly distributed infra-red emissive particles in the matrix resulted in increased infra-red output at the external surface 14 of the matrix for the same gas consumption. It is speculated that this occurs because agglomerated particles that are buried within clumps or otherwise blocked from providing optimal infra-red output are significantly reduced in the novel matrix of the present invention. When the infra-red emissive particles are more uniformly distributed, each of them individually emit optimal infrared radiation thus providing increased infrared output for paper drying at the same gas consumption. Also, individual particles tend to heat more readily due to the hot gas stream than clumps of agglomerated particles. The result is that the individual particles achieve temperatures closer to the net gas temperature due to the smaller thermal mass of the smaller particles. Therefore, it is possible to operate a heater equipped with the novel ceramic matrix 10 of the present invention at a lower gas consumption rate to lower the exhaust gas volume and temperature while still achieving the same infrared output. Lower exhaust gas temperatures lead to decreased wear on the heater equipment and improved durability.

The ceramic matrix of the present invention can be further modified to provide a ceramic matrix with an enhanced service life. During formation of the ceramic matrix according to the steps described above, it is possible to mix additional ceramic fibers of a different composition having a different melting temperature into the mixture. The additional ceramic fibers must have a lower melting/glassy fiber re-crystallisation temperature. Typically, ceramic fibers are temperature rated on the basis of this structural change. Since most ceramic fibers are glassy, they have a softening and working point with a low viscosity. When ceramic fibers having different melting temperatures are mixed and exposed to high temperatures, the lower melting point glassy fibers melt and wet the higher melting point glassy fibers dissolving some of the constituents of the higher melting fiber, essentially resulting in a crystalline product. The melting point of the crystalline product is dependent on its local composition and may be higher than the initial softening and working point of the initial glassy fiber. This wetting, dissolution and crystallization results in a ceramic bond between fibers. Wetting occurs at the first heating of the matrix in an infrared heater. In addition, the melting temperature of the additional ceramic fibers is selected such that melting occurs at the normal operating temperatures of external surface 14 of ceramic matrix 10. Therefore, during the first heating cycle of the heating unit, melting and re-crystallization of the lower melting temperature ceramic fiber will occur at external surface 14 resulting in the creation of crystalline stable ceramic bond regions between the two ceramic fiber compositions at the external surface. This tends to create a-stable, hardened layer of the matrix at the external surface 14.

It is preferable that an ionic wetting agent be used in the manufacture of the above matrix. The ionic wetting agent improves the mixing and distributes the two ceramic fiber compositions so that melting and re-crystallization interactions will tend to be more frequent. If an ionic wetting agent is not used, fiber clumps tend to form that reduces mixing of the fibers such that the low melting point glassy fibers will melt independently without interacting with the high melting point fibers leading to reduced ceramic bond formation.

In conventional ceramic matrices, the organic binder material tends to burn out immediately during first ignition in the outermost 1 mm of external surface 14 due to the high operating temperatures adjacent the surface. The result is reduced mechanical strength. This region therefore tends to be prone to erosion by air currents carried by the boundary layer associated with a rapidly moving paper web as well as actual abrasion from the paper web when paper breakage occurs.

The improved ceramic matrix of the present invention automatically forms a hardened layer at external surface 14 as described above to resist erosion forces. Since melting occurs only at external surface 14 where the temperature is highest, the hardened layer is only generated in this region. Any erosion damage to the external surface will tend to expose fresh ceramic matrix material with lower melting temperature ceramic fibers that will melt to re-establish the hardened layer in a "self-healing" process.

It is possible to have more than two different compositions of ceramic fibers in the ceramic matrix. At least one composition of ceramic fibers must have a melting temperature lower than the highest operating temperature of the ceramic matrix, and the remaining compositions must have a melting temperature greater than the highest operating temperature.

It is important to note that prototype testing of the ceramic matrix using ceramic fiber compositions with two different melting temperatures determined that such a matrix operates in the normal pressure range of heater units indicates that no plugging of the conventional pore structure of the ceramic matrix occurs due to formation of the hardened layer.

Figure 2:
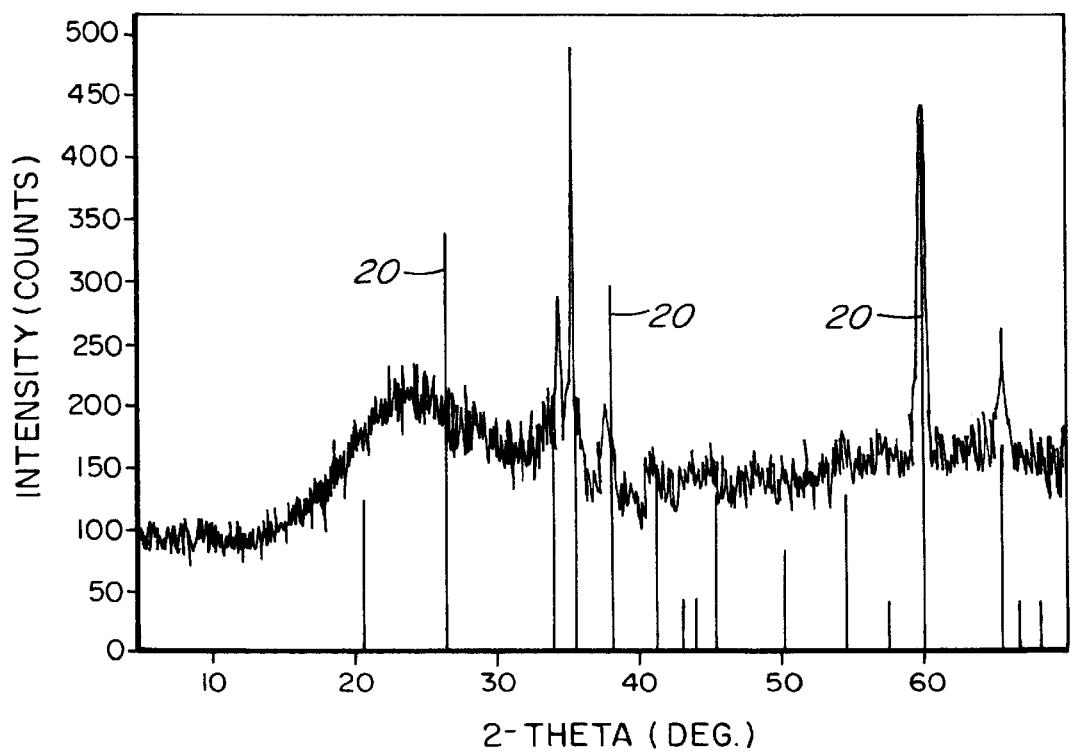
FIG. 2 is an X-ray diffraction pattern of an embodiment of the ceramic matrix material according to the present invention containing at least two ceramic fiber compositions having different melting temperatures.

FIG. 2 is an X-ray diffraction pattern of the novel ceramic matrix of the present invention using two ceramic fiber compositions. The pattern verifies the amorphous nature of the matrix. The Copper K alpha diffraction patterns show the amorphous fiber matrix and the crystalline silicon carbide infra-red emitting phase. Lines 20 represent silicon carbide. The x-ray diffraction shows that the crystallized region created by the two fiber interaction as described above creates very little crystalline material that is not readily observable within the wide spectrum of the amorphous fiber peaks. However, silicon carbide which is present in large quantity is easily seen as the predominant crystalline phase.

Figure 3:
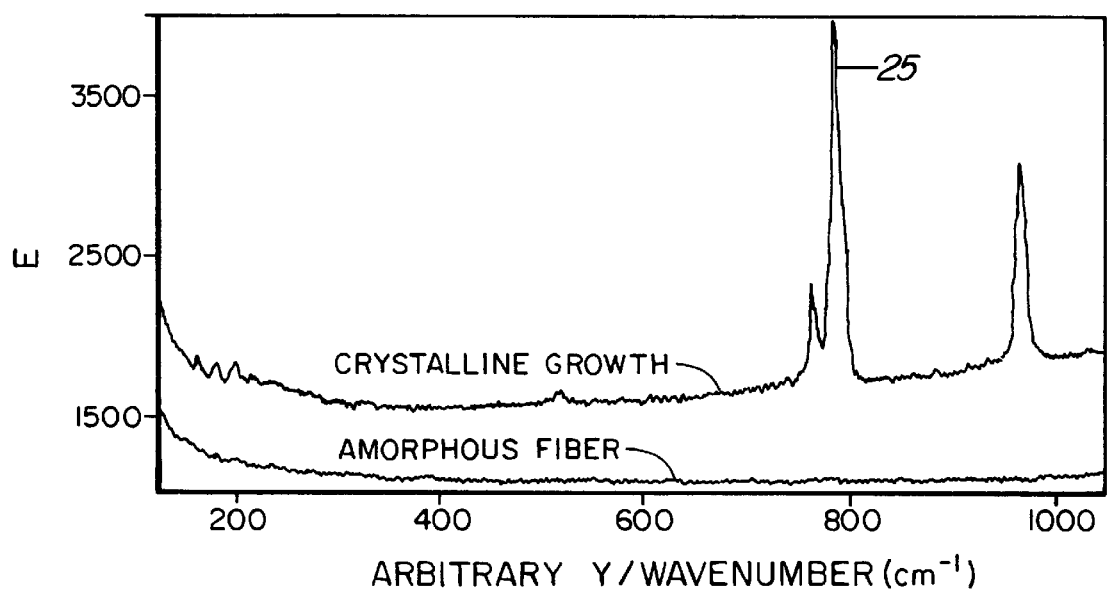
FIG. 3 is a Micro-Raman spectroscopy pattern of the ceramic matrix material according to the present invention.

FIG. 3 is a Micro-Raman spectroscopy pattern of the novel ceramic matrix of the present invention using two ceramic fiber compositions. Raman spectroscopy is sensitive to crystalline phases in a material due to the material's vibration properties which interact with a laser light beam. Crystalline material shows up very differently from that of an amorphous material which essentially shows no Raman peaks. FIG. 3 shows that the ceramic fibers used in the matrix of the present show up without peaks and are therefore essentially amorphous and glass like, while the re-melted regions show up with large peaks 25, and are therefore crystalline. Each peak represents a particular mode of vibration of the crystalline phase and is characteristic of the structure of the crystalline phase.

Although the present invention has been described in some detail by way of example for purposes of clarity and understanding, it will be apparent that certain changes and modifications may be practised within the scope of the appended claims.

I claim:

1. A method of forming a porous ceramic matrix for use in an infrared heating unit comprising the steps of:
    mixing ceramic fibers, organic binders and particulate material capable of infrared emissivity with an ionic detergent to form a moldable ceramic mixture; and
    molding the mixture to a desired shape.

2. The method as claimed in claim 1 in which the ionic detergent is an anionic detergent.

3. The method as claimed in claim 1 in which the ionic detergent is a cationic detergent.

4. The method as claimed in claim 1 in which the particulate material capable of infrared emissivity is silicon carbide.

5. The method as claimed in claim 1 in which the particulate material capable of infrared emissivity is selected from the group consisting of silicon, silicon nitride, silicon carbonitride.

6. The method as claimed in claim 5 in which the particulate material capable of infrared emissivity is a mix of different materials.

7. The method as claimed in claim 1 in which the particulate material capable of infrared emissivity is an intermetallic compound.

8. The method as claimed in claim 7 in which the intermetallic compounds are selected from the group consisting of titanium diboride, titanium silicide, niobium suicide and tantalum silicide.

9. The method as claimed in claim 1 in which the organic binders are selected from the group consisting of starch, thermoplastic polymers, and agar cereal binders.

10. The method as claimed in claim 1 in which the ceramic fibers are selected from the group consisting of alumina silica fibers and alumina silica zirconia fibers.

11. The method as claimed in claim 1 in which the mixing step involves:
    adding the ceramic fibers to water with the ionic wetting agent to form an aqueous slurry; and
    adding the organic binders and the particulate material capable of infrared emissivity to the aqueous slurry to form the moldable ceramic mixture.

12. The method as claimed in claim 1 including the step of:
    mixing at least two different compositions of ceramic fibers into the mixture with each composition having a different melting temperature.

13. The method as claimed in claim 12 in which ceramic fibers of one composition are selected to have a melting temperature greater than the highest operating temperature of the ceramic matrix and ceramic fibers of the other composition are selected to have a melting temperature lower than the highest operating temperature of the ceramic matrix whereby melting of the lower temperature ceramic matrix forms bonds between the ceramic fibers.

14. A ceramic matrix for use in an infrared heating unit comprising a mixture of ceramic fibers, organic binders and particulate material capable of infrared emissivity formed with an ionic detergent such that the particulate material capable of infrared emissivity is mixed substantially uniformly throughout the matrix.

15. The matrix as claimed in claim 14 in which the ionic detergent is an anionic detergent.

16. The matrix as claimed in claim 14 in which the ionic detergent is a cationic detergent.

17. The matrix as claimed in claim 14 in which the particulate material capable of infrared emissivity is silicon carbide.

18. The matrix as claimed in claim 14 in which the particulate material capable of infrared emissivity is selected from the group consisting of silicon, silicon nitride, silicon carbonitride.

19. The matrix as claimed in claim 14 in which the particulate material capable of infrared emissivity is a mix of different materials.

20. The matrix as claimed in claim 14 in which the particulate material capable of infrared emissivity is an intermetallic compound.

21. The matrix as claimed in claim 20 in which the intermetallic compound is selected from the group consisting of titanium diboride, titanium silicide, niobium silicide and tantallum silicide.

22. The matrix as claimed in claim 14 in which the organic binders are selected from the group consisting of starch, thermoplastic polymers, and agar cereal binders.

23. The matrix as claimed in claim 14 in which the ceramic fibers are selected from the group consisting of alumina silica fibers and alumina silica zirconia fibers.

24. The matrix as claimed in claim 14 including at least two different compositions of ceramic fibers with each composition having a different melting temperature.

25. The matrix as claimed in claim 24 in which at least one composition of ceramic fibers are selected to have a melting temperature greater than the highest operating temperature of the ceramic matrix, and the compositions of the other ceramic fibers are selected to have a melting temperature lower than the highest operating temperature of the ceramic matrix.

26. A ceramic matrix for use in an infrared heating unit comprising a mixture of at least two ceramic fiber compositions having different melting temperatures, organic binders and particulate material capable of infrared emissivity, the mixture being formed with an ionic wetting agent such that the particulate material capable of infrared emissivity and the at least two ceramic fiber compositions are mixed substantially uniformly throughout the matrix.

27. An infrared heating unit comprising: a metallic housing;

a ceramic matrix comprising a mixture of ceramic fibers, organic binders and particulate material capable of infrared emissivity formed with an ionic detergent such that the particulate material capable of infrared emissivity is mixed substantially uniformly throughout the matrix;

the matrix being mounted in the housing and having an inner surface, side walls and an external surface, the inner surface of the ceramic matrix and the housing cooperating to define a chamber;

an inlet to the housing to admit a gas/air combustion mixture to the chamber whereby the gas/air mixture passes through the ceramic matrix to burn adjacent the external surface of the ceramic matrix to heat the external surface.

28. A method of forming a porous ceramic matrix for use in an infrared heating unit comprising the steps of:

mixing at least two different compositions of ceramic fibers with each composition having a different melting temperature with organic binders and particulate material capable of infrared emissivity, and an ionic wetting agent to form a moldable ceramic mixture; and molding the mixture to a desired shape.

29. The method as claimed in claim 28 in which ceramic fibers of one composition are selected to have a melting temperature greater than the highest operating temperature of the ceramic matrix and ceramic fibers of the other composition are selected to have a melting temperature lower than the highest operating temperature of the ceramic matrix whereby melting of the lower temperature ceramic matrix forms bonds between the ceramic fibers.

30. A ceramic matrix for use in an infrared heating unit comprising a mixture of:

at least two different compositions of ceramic fibers with each composition having a different melting temperature;

organic binders;

particulate material capable of infrared emissivity; and an ionic wetting agent which acts to disperse the particulate material capable of infrared emissivity substantially uniformly throughout the matrix.

31. The matrix as claimed in claim 30 in which at least one composition of ceramic fibers are selected to have a melting temperature greater than the highest operating temperature of the ceramic matrix, and the compositions of the other ceramic fibers are selected to have a melting temperature lower than the highest operating temperature of the ceramic matrix.

32. A method of forming a porous ceramic matrix for use in an infrared heating unit comprising the steps of:

mixing ceramic fibers, organic binders and an intermetallic particulate material capable of infrared emissivity with an ionic wetting agent to form a moldable ceramic mixture; and molding the mixture to a desired shape.

33. A method as claimed in claim 32 in which the intermetallic material is selected from the group consisting of titanium diboride, titanium silicide, niobium silicide and tantallum silicide.

34. A ceramic matrix for use in an infrared heating unit comprising a mixture of ceramic fibers, organic binders and intermetallic particulate material capable of infrared emissivity formed with an ionic wetting agent such that the particulate material capable of infrared emissivity is mixed substantially uniformly throughout the matrix.

35. The matrix as claimed in claim 34 in which the intermetallic particulate material is selected from the group consisting of titanium diboride, titanium silicide, niobium silicide and tantallum silicide.

36. A method of forming a porous ceramic matrix for use in an infrared heating unit comprising the steps of:

mixing ceramic fibers, organic binders, and particulate material capable of infrared emissivity with an ionic wetting agent to form a moldable ceramic mixture, said particulate material comprising a mix of material selected from the group consisting of silicon, silicon nitride and silicon carbonitride; and molding the mixture to a desired shape.

* * * * *